July 31, 1956

J. F. ZALESKI 2,757,366

CLOSED PATH DELAY LINE

Filed April 16, 1953

INVENTOR.
JOHN F. ZALESKI
BY H. L. Mackay
ATTORNEY 2,757,366

CLOSED PATH DELAY LINE

John F. Zaleski, Thornwood, N. Y., assignor to General Precision Laboratory Incorporated, a corporation of New York Application April 16, 1953, Serial No. 349,269

10 Claims. (Cl. 343—17.7)

This invention relates to an apparatus for delaying a microwave signal, and more particularly to such an apparatus suitable for use as an echo box.

In the prior art, tuned circuits of various kinds have been used to store energy from an exciting source and deliver the stored energy after removal of the excitation. Such tuned circuits may comprise resonant sections of transmission lines, an inductance and capacitance, or a cavity resonator. However, all of these devices are sharply tuned and will operate only within a very narrow band of frequencies.

A broad banded delay apparatus might comprise a long length of an actual transmission line. However, a line long enough to introduce sufficient delay is quite bulky and makes the use of an actual transmission line both expensive and inconvenient. At frequencies below the microwave region, artificial lines comprising lumped reactances are reasonably compact and are widely used. At first glance it might be thought that a wave guide filled with a material having a high dielectric constant would serve satisfactorily as an artificial transmission line in the microwave region. However, with the dielectric materials currently available, a sufficient time delay is accompanied by an intolerably high attenuation.

It is an object of this invention to provide a microwave delay apparatus affording an appreciable time delay without excessive attenuation.

Another object of the invention is to provide a microwave time delay apparatus which will operate over a wide band of frequencies.

Another object of the invention is to provide a microwave time delay apparatus with modest space requirements.

Another object of the invention is to provide a microwave time delay apparatus suitable for use as an echo box.

Another object of the invention is to provide a circuit for coupling a radar system to the time delay apparatus operating as an echo box.

In accordance with one embodiment of the invention, the microwave signal to be delayed is applied to the E plane arm of a hybrid junction, or magic tee. One collinear arm of the magic tee is connected by means of a wave guide loop to the H plane arm of the tee. The output circuit is connected to the other collinear arm. The length of the wave guide loop is determined according to the amount of time delay desired and the permissible attenuation. In one system it has been found that a loop approximately 30 feet long can be used to provide a delay of approximately one microsecond before the delayed signal is lost in receiver noise. Alternatively, a directional coupler may be substituted for the hybrid junction.

For a more complete understanding of the invention, reference may be made to the accompanying drawing in which.

Figures 1, 2, 3, 4:
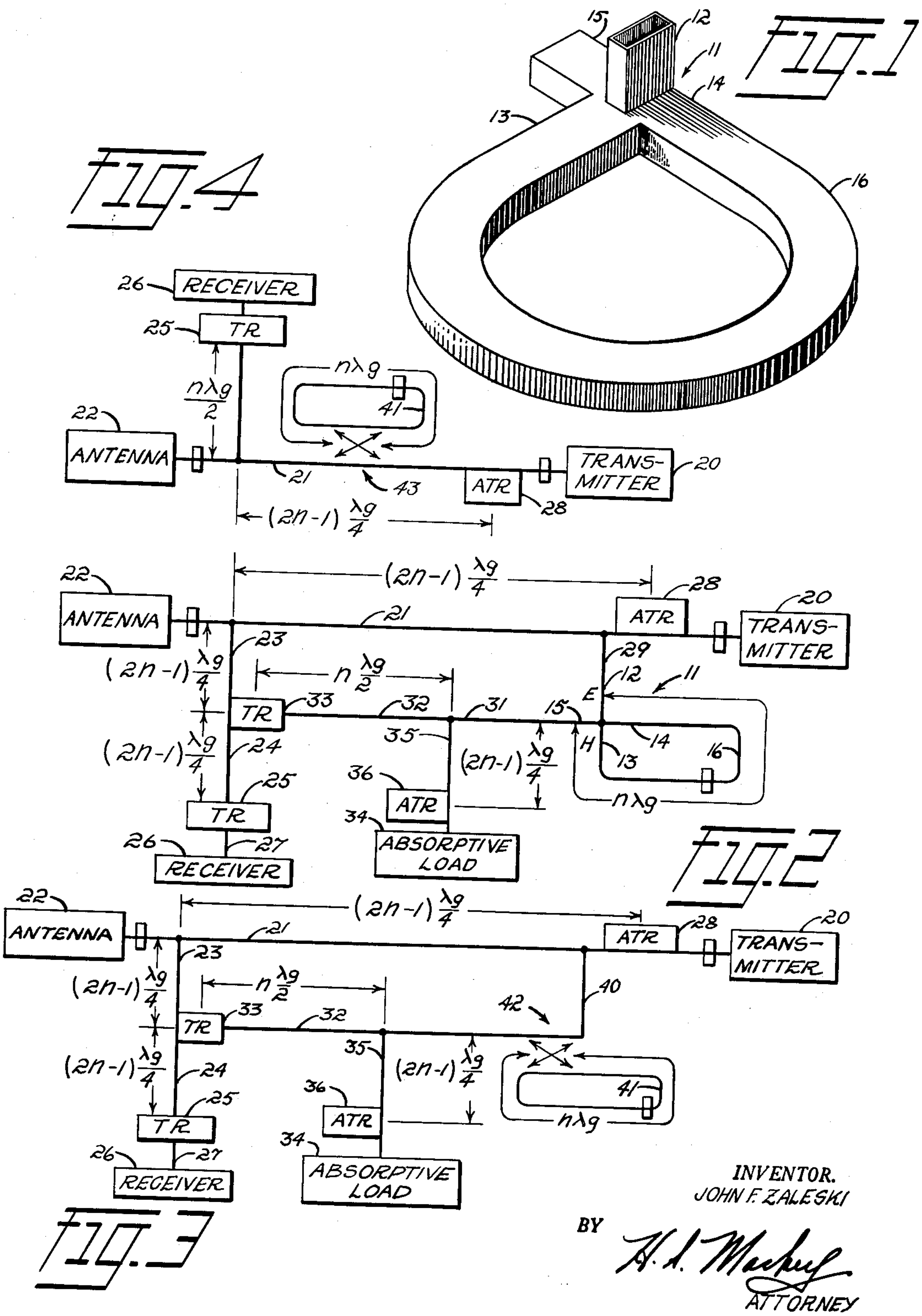
Figure 1 is a diagram of a magic tee with a wave guide loop connecting the H plane arm and one of the collinear arms.
Figure 2 is a schematic diagram illustrating the use of the device shown in Fig. 1 as an echo box in a radar system.
Figure 3 is a diagram of a modification of the arrangement of Fig. 2.
Figure 4 is a diagram of another modification of the invention.

Referring now to Fig. 1, there is shown a hybrid junction or magic tee indicated generally by the reference character 11 which comprises an E plane arm 12, an H plane arm 13, and two collinear arms 14 and 15. The collinear arm 14 and the H plane arm 13 are connected by means of a wave guide loop 16.

If a signal of short duration be applied to the arm 12 the power will divide equally between arms 14 and 15. The portion entering arm 14 will be propagated by wave guide 16 and will re-enter the junction through H plane arm 13. This power will also be divided equally between arms 14 and 15, the portion entering arm 14 being again propagated along wave guide 16 back to the junction.

It can be seen that even after the removal of the signal entering arm 12, there will be power circulating through the wave guide loop 16, a portion of which will be propagated along the arm 15 and is available for application to any desired apparatus. If the signal applied to arm 12 be longer in duration than the time of propagation around the loop 16, the length of loop 16 is preferably made an integral number of guide wave lengths so that the energy entering the junction simultaneously through arms 12 and 13 will be in phase thereby increasing the amount of energy circulating in loop 16.

Referring now to Fig. 2, a radar transmitter 20 is connected by means of a main wave guide 21 to an antenna 22. Two serially connected branch wave guides 23 and 24, each an odd number of quarter guide wavelengths long, connect a TR switch 25 to the main wave guide 21. A radar receiver 26 is connected by means of a wave guide 27 to the TR switch 25. An ATR switch 28 is coupled to the main wave guide 21 between the transmitter 20 and the branch wave guide 23 at an odd number of quarter guide wavelengths from the branch wave guide 23. As in Fig. 1, the collinear arm 14 and the H plane arm 13 of the magic tee 11 are joined by means of a wave guide loop 16. The loop 16 is preferably made an integral number of guide wavelengths long, although this is not essential. The E plane arm 12 of magic tee 11 is connected to a branch wave guide 29 which in turn is coupled to the main wave guide 21 at a point between the ATR switch 28 and the branch wave guide 23. The coupling between wave guides 21 and 29 is preferably secured by means of an iris, although other forms of coupling can be used if desired. The collinear arm 15 of the magic tee 11 is connected by means of a wave guide 31 to a wave guide 32 which in turn is connected to a TR switch 33. The distance from the electrical center of the TR switch 33 to the junction of wave guides 31 and 32 is made an integral number of half guide wavelengths long. The TR switch 33 is preferably joined directly to the junction of wave guides 23 and 24, as shown in the drawings. However, if desired it may be placed in wave guide 32 at a point between the junction of wave guide 32 with wave guides 23 and 24 and the junction of wave guide 32 with wave guide 31. In either case, the distance between the TR switches 25 and 33 should be an odd number of quarter guide wavelengths, while the distance from the TR switch 33 to the junction of wave guides 31 and 32 should be an integral number of half guide wavelengths. An absorptive load 34 is connected by a wave guide 35 to the junction of wave guides 31 and 32. The load 34 is preferably a resistive load capable of absorbing, without reflection, substantially all of the power applied to it through the wave guide 35. An ATR switch 36 is coupled to wave guide 35 at a point an odd number of quarter guide wavelengths from the junction of wave guide 35 with wave guides 31 and 32.

The apparatus above described may be used as an echo box to test and adjust the radar receiver 26 when there are not actual targets available. In operation, pulses are generated by the transmitter 20 and propagated along the main wave guide 21 to the antenna 22. The TR switch 25 and the ATR switch 28 operate in the usual manner to keep the transmitted pulse out of the receiver 26 and to direct energy received by the antenna 22 to the receiver 26. A portion of each transmitter pulse travels along the wave guide 29 and enters the magic tee 11 through the E plane arm 12. The power divides equally between arms 14 and 15. The portion entering arm 14 will be propagated around the loop 16 and will reenter the junction through the H plane arm 13, where it will divide equally between arms 14 and 15. Thus a circulating flow of energy will be set up in the loop 16. If the loop 16 is an integral number of guide wavelengths long, the energy entering the tee through arm 13 will be in phase with that entering through arm 12. The portion of the energy leaving the tee through the arm 15 will be propagated through the waveguides 31 and 32, but will be prevented from entering waveguides 23 and 24 by the ionized TR switch 33. The wave will therefore be reflected and will arrive at the junction of waveguides 31 and 32 in the proper phase relationship with the wave in waveguide 31 for propagation into the waveguide 35. The ionized ATR switch 36 will present a low impedance path to energy incident in waveguide 35 so that this energy will flow to the load 34 where it will be absorbed. During the intervals between pulses, all of the TR and ATR switches are de-ionized so that half of the energy circulating in the loop 16 will travel through wave guides 31 and 32, TR switch 33, wave guide 24, TR switch 25 and wave guide 27 to the receiver 26. The ATR switch 36 will prevent the energy in wave guide 31 from being propagated through wave guide 35 to the load 34.

A delay apparatus as just described can be readily designed. It would be possible to omit the magic tee 11 and loop 16 and to join the wave guide 29 to the wave guide 31 by a long wave guide. But to provide a delay of one microsecond would require a wave guide on the order of 900 feet long. By using the present invention, a delay of one microsecond may be obtained by making the loop 16 on the order of 30 feet long. This can be done because of the attenuation permissible. The usual radar receiver is sensitive to signals having only a small fraction of the strength of the transmitted pulse, so that an attenuation on the order of 100 db or more is tolerable. If a loop 30 feet in length is considered, 33 passages around the loop will give a delay equal to that of a continuous guide over 900 feet long. Each passage will result in a loss of one half the power, or 3 db, so that the total loss in 33 passages will be about 100 db. In an echo box, such an attenuation is not only permissible, it is desirable.

Fig. 3 illustrates a system similar to that shown in Fig. 2. Like elements are denoted by like reference characters in the two figures. The principal difference is that a directional coupler has been substituted for the magic tee 11.

In Fig. 3, a wave guide 40 is coupled to the main wave guide 21 at a point between the ATR switch 28 and the branch wave guide 23. The other end of wave guide 40 is connected to the junction of wave guides 32 and 35. A closed wave guide loop 41, similar to the loop 16, is coupled to the wave guide 40 by means of a directional coupler 42 so that energy from the transmitter 20 will circulate around the loop 41 in one direction only (counterclockwise as shown in the drawing). Similarly, energy circulating around the loop 41 in this direction is coupled to the wave guide 40 so as to flow toward the receiver 26 while being prevented from flowing toward the transmitter 20. The loop 41 is preferably made an integral number of guide wavelengths long, although this is not essential.

The operation of the embodiment of Fig. 3 is similar to that of the embodiment of Fig. 2. During the pulse time of transmitter 20, energy flows through wave guide 21 to the antenna 22 and also through wave guide 40 to the directional coupler 42. A portion of the energy in wave guide 40 is coupled, by coupler 42, to the wave guide loop 41 thereby initiating a circulation of energy around the loop 41. On each cycle of energy flow around the loop 41, a portion of the energy will be coupled to wave guide 40 and be absorbed in load 34, as explained in connection with the embodiment of Fig. 2. During the intervals between pulses, energy from the loop 41 will be propagated to the receiver 26.

Fig. 4 illustrates another embodiment of the invention. The radar system is the same as in the other embodiments, and like elements have been denoted by like reference characters. The main wave guide 21 connecting the transmitter 20 to the antenna 22 is coupled to the closed loop wave guide 41 by means of a directional coupler 43 placed between the ATR switch 28 and the wave guide leading to TR switch 25. Coupler 43 is arranged to allow a portion of the energy in wave guide 21 which is flowing from the transmitter toward the antenna to be coupled to the closed loop wave guide 41 and to allow a portion of the energy in loop 41 to be coupled to wave guide 21 so as to be propagated toward the antenna 22.

The operation of the embodiment of Fig. 4 is similar to that of the embodiments previously described. During the pulse from transmitter 20, a portion of the energy in wave guide 21 is diverted through coupler 43 to the loop 41, where a circulating flow of energy is initiated. A portion of the circulating energy passes through coupler 43 to wave guide 21 and flows toward the antenna. At the end of the pulse there will be energy circulating in loop 41, a portion of which is continuously propagated through coupler 43 to wave guide 21. A portion of this energy will flow through the TR switch 25 to the receiver 26.

It can be seen that each of the described embodiments attains the objects of the invention. The band width is as broad as that of the wave guide employed. The length of the closed path is only about 30 feet compared to the 900 feet required by an ordinary looped line affording the same delay. A delay greater than one microsecond is readily obtainable.

The invention has been described with respect to a number of preferred embodiments. However, many modifications may be made within the scope of the invention. For example, in the embodiment shown in Fig. 2, the H plane arm of the magic tee could be used as the input in which case the E plane arm would be connected through loop 16 to one collinear arm, the other collinear arm serving as an output. One collinear arm could also be used as the input in which case the H plane arm could be connected to the other collinear arm by means of a loop, the output being taken from the E plane arm. Also, one collinear arm could serve as the input with the loop connecting the E plane arm and the other collinear arm, with the output being taken from the H plane arm.

As another example, the length of loop 16 or 41 could be somewhat reduced by using a dielectric filled wave guide. Some low loss dielectrics are currently available, which would permit a substantial reduction in the length of the loop in those cases where additional attenuation is tolerable. One such dielectric is a tetrafluorethylene resin sold under the trademark "Teflon." Many other modifications will occur to those skilled in the art.

What is claimed is:

1. In a radar system including a transmitter and an antenna connected by a main transmission path and a receiver connected to an electronic switch which in turn is connected to the main transmission path by an auxiliary transmission path, apparatus for furnishing a simulated signal to the receiver comprising a closed loop transmission path, a first branch transmission path for propagating energy from said transmitter to said closed loop transmission path, and a second branch transmission path for propagating energy from said closed loop transmission path to said auxiliary transmission path.

2. In a radar system including a transmitter and a receiver alternately connected to an antenna by electronic switching means, apparatus for furnishing a simulated signal to the receiver comprising, a re-entrant wave guide, and coupling means for transferring a portion of the energy from the transmitter to said wave guide and for transferring a portion of the energy in said wave guide to said receiver.

3. Apparatus according to claim 2 in which said re-entrant wave guide is an integral number of guide wave lengths long.

4. Apparatus according to claim 2 in which said coupling means is a magic tee.

5. Apparatus according to claim 2 in which said coupling means is a directional coupler.

6. In a radar system including a transmitter and an antenna connected by a main transmission path and a receiver connected to an electronic switch which is in turn connected to the main transmission path by an auxiliary transmission path, apparatus for furnishing a simulated signal to the receiver comprising, a four armed coupling device, means for connecting the first arm of said device to said transmitter, means for connecting together the second and third arms of said device by means of a branch transmission path, and means for connecting the fourth arm of said device to said auxiliary transmission path.

7. Apparatus according to claim 6 in which said coupling device is a magic tee.

8. Apparatus according to claim 6 in which said coupling device is a directional coupler.

9. A signal simulator for a radar system comprising, a radar transmitter connected to an antenna by means of a first wave guide, a second wave guide an integral number of half guide wavelengths long connecting said first wave guide to an electronic switch, a radar receiver connected to said switch, a four armed coupling device, a third wave guide connecting the first arm of said coupling device to said first wave guide at a point between said transmitter and said second wave guide, a fourth wave guide an integral number of guide wavelengths long connecting the second and third arms of said device, and a fifth wave guide connecting the fourth arm of said device to said second wave guide.

10. In a pulsed radar system including a transmitter and a receiver alternately connected to an antenna by electronic switching means, apparatus for supplying a simulated echo signal to the receiver comprising a guided transmission path closed upon itself to form a loop, means for introducing a portion of the energy of each transmitted pulse to said loop to cause a circulating flow of energy in said loop, means for continuously abstracting a portion of the energy flowing in said loop, means for absorbing the abstracted energy during each pulse and means for applying the abstracted energy to said receiver during the intervals between pulses.

References Cited in the file of this patent

UNITED STATES PATENTS

| | | |
|---|---|---|
| 2,532,539 | Counter et al. | Dec. 5, 1950 |
| 2,633,492 | Ring | Mar. 31, 1953 |
| 2,639,326 | Ring | May 19, 1953 |